(12) United States Patent
Maeoka et al.

(10) Patent No.: US 9,255,812 B2
(45) Date of Patent: Feb. 9, 2016

(54) NAVIGATION SYSTEM AND NAVIGATION METHOD

(71) Applicant: Hitachi, Ltd., Tokyo (JP)

(72) Inventors: Jun Maeoka, Tokyo (JP); Hideki Takano, Tokyo (JP)

(73) Assignee: HITACHI, LTD., Tokyo (JP)

( * ) Notice: Subject to any disclaimer, the term of this patent is extended or adjusted under 35 U.S.C. 154(b) by 102 days.

(21) Appl. No.: 14/063,448

(22) Filed: Oct. 25, 2013

(65) Prior Publication Data

US 2014/0129144 A1 May 8, 2014

(30) Foreign Application Priority Data

Nov. 7, 2012 (JP) .................................. 2012-245156

(51) Int. Cl.
  *G01C 21/36* (2006.01)

(52) U.S. Cl.
  CPC ........ *G01C 21/3626* (2013.01); *G01C 21/3697* (2013.01)

(58) Field of Classification Search
  CPC ............. G01C 21/3632; G01C 21/367; G01C 21/3658; G01C 21/3626; G01C 21/3629; G01C 21/3647; G01C 21/3682; G01C 21/36; G01C 21/3611; G01C 21/3635; G01C 21/3623; G01C 21/3673; G01C 21/3676; G01C 21/3691; G01C 21/3694; G01C 21/3697; G08G 1/096861; G08G 1/0969; G08G 1/096827; G08G 1/096838
  USPC ......... 701/533, 437, 428, 431, 454, 532, 455, 701/516, 469
  See application file for complete search history.

(56) References Cited

U.S. PATENT DOCUMENTS

| | | | | |
|---|---|---|---|---|
| 5,874,905 A * | 2/1999 | Nanba et al. | ................ | 340/995.2 |
| 6,415,224 B1 * | 7/2002 | Wako et al. | ................... | 701/409 |
| 6,810,328 B2 * | 10/2004 | Yokota et al. | .................. | 701/414 |
| 7,844,394 B2 * | 11/2010 | Kim | ............................... | 701/412 |
| 2005/0261822 A1 * | 11/2005 | Wako | ............................ | 701/200 |
| 2007/0106460 A1 * | 5/2007 | Nakayama et al. | ........... | 701/201 |
| 2007/0106470 A1 * | 5/2007 | Nakayama et al. | ........... | 701/211 |
| 2008/0275637 A1 * | 11/2008 | Kim et al. | ...................... | 701/201 |
| 2009/0037093 A1 * | 2/2009 | Kurihara et al. | .............. | 701/201 |
| 2009/0043493 A1 * | 2/2009 | Sakai | ............................. | 701/207 |
| 2009/0063041 A1 * | 3/2009 | Hirose et al. | .................. | 701/209 |
| 2009/0259398 A1 * | 10/2009 | Wang | ............................. | 701/213 |
| 2009/0281727 A1 * | 11/2009 | Nagatani et al. | .............. | 701/210 |
| 2011/0288766 A1 * | 11/2011 | Nagasawa et al. | ............. | 701/201 |
| 2013/0116919 A1 * | 5/2013 | Furuhata | ............ | G01C 21/3629 |
| | | | | 701/408 |

FOREIGN PATENT DOCUMENTS

| | | |
|---|---|---|
| JP | 2002-236029 A | 8/2002 |
| JP | 2006-267328 A | 10/2006 |

* cited by examiner

*Primary Examiner* — Truc M Do
(74) *Attorney, Agent, or Firm* — Volpe and Koenig, P.C.

(57) ABSTRACT

There is provided a navigation system having a guidance-controller, the guidance-controller controlling the sequence of guidances, and priority, according to an execution condition set depending on the type of a relevant guidance, while determining whether or not a guidance is executed according to the execution condition to thereby alter the teaching of guidance-execution. If overlapping by plural guidances using speech, and screen display occurs, the simple display of the guidance lower in priority is executed, and if the guidance falls outside an effective range, the guidance is interrupted, or the guidance during standby-display is not executed. Thereby, plural guidances are concurrently displayed, and a meaningless guidance is not displayed.

12 Claims, 17 Drawing Sheets

| 402 EVENT PROCESSING FUNCTION | 501 NORMAL DISPLAY PROCESSING | 502 SIMPLE DISPLAY PROCESSING | 503 DELAYED TIME PROCESSING |
|---|---|---|---|
| onDangerAlert() | · MESSAGE "A VEHICLE IS IN A DANGER AREA. DRIVE WITH CAUTION" · TERMINATION CONDITION: THE DANGER AREA IS PASSED THROUGH | PASSING THROUGH A DANGER AREA | RECORD AND SAVE |
| onDangerCount() | · MESSAGE "DANGER-ZONE PASSING FREQUENCY IS ADDED" · TERMINATION CONDITION: AFTER THE ELAPSE OF 3 sec | DANGER FREQUENCY ADDED | RECORD AND SAVE |
| onSpeedExceeded() | · MESSAGE "THE SPEED HAS EXCEEDED XX km" · TERMINATION CONDITION: AFTER THE ELAPSE OF 10 sec | WATCH THE SPEED | RECORD AND SAVE |
| onGoal() | · MESSAGE "YOU HAVE ARRIVED AT THE DESTINATION. GUIDANCE IS FINISHED" · TERMINATION CONDITION: DISPLAY IS CANCELLED BY A USER | HAVE ARRIVED THE DESTINATION | - |
| onCorner() | · MESSAGE "TURN TO THE RIGHT XX km AHEAD" DRIVE WITH CAUTION" · AN IMAGE: AN ICON INDICATING A DIRECTION FOR TURNING · TERMINATION CONDITION: A TURNING CORNER IS PASSED BY | NEXT TURN TO THE RIGHT | - |

FIG.2

| POSITION (LATITUDE, LONGITUDE) | RADIUS |
|---|---|
| LAT. 35.621 N<br>LOG. 139.157 E | 500m |
| LAT. 35.128 N<br>LOG. 139.198 E | 20m |
| LOG. 35.561 E<br>LAT. 139.289 N | 10m |
| ⋮ | ⋮ |

| EVENT FACTOR | EVENT PROCESSING FUNCTION | ALLOWABLE CONDITION | PRIORITY |
|---|---|---|---|
| DANGER AREA | onDangerAlert() | FROM AN EVENT OCCURRENCE POINT UP TO AN END OF A DANGER AREA | HIGH |
| DANGER AREA | onDangerCount() | ∞ | LOW |
| CROSSOVER POINT | onCorner() | 5 m FROM AN EVENT OCCURRENCE POINT | HIGH |
| SPEEDING | onSpeedExceeded() | FOR 3 sec FROM AN EVENT OCCURRENCE POINT | MIDDLE |
| DESTINATION | onGoal() | 30 m FROM AN EVENT OCCURRENCE POINT | MIDDLE |

| EVENT PROCESSING FUNCTION (402) | NORMAL DISPLAY PROCESSING (501) | SIMPLE DISPLAY PROCESSING (502) | DELAYED TIME PROCESSING (503) |
|---|---|---|---|
| onDangerAlert() | · MESSAGE "A VEHICLE IS IN A DANGER AREA. DRIVE WITH CAUTION"<br>· TERMINATION CONDITION: THE DANGER AREA IS PASSED THROUGH | PASSING THROUGH A DANGER AREA | RECORD AND SAVE |
| onDangerCount() | · MESSAGE "DANGER-ZONE PASSING FREQUENCY IS ADDED"<br>· TERMINATION CONDITION: AFTER THE ELAPSE OF 3 sec | DANGER FREQUENCY ADDED | RECORD AND SAVE |
| onSpeedExceeded() | · MESSAGE "THE SPEED HAS EXCEEDED XX km"<br>· TERMINATION CONDITION: AFTER THE ELAPSE OF 10 sec | WATCH THE SPEED | RECORD AND SAVE |
| onGoal() | · MESSAGE "YOU HAVE ARRIVED AT THE DESTINATION. GUIDANCE IS FINISHED"<br>· TERMINATION CONDITION: DISPLAY IS CANCELLED BY A USER | HAVE ARRIVED THE DESTINATION | – |
| onCorner() | · MESSAGE "TURN TO THE RIGHT XX km AHEAD" DRIVE WITH CAUTION"<br>· AN IMAGE: AN ICON INDICATING A DIRECTION FOR TURNING<br>· TERMINATION CONDITION: A TURNING CORNER IS PASSED BY | NEXT TURN TO THE RIGHT | – |

FIG.9

| EVENT PROCESSING FUNCTION (402) | EVENT OCCURRENCE POSITION (901) | EVENT OCCURRENCE TIME (902) | TOLERANCE (903) | PRIORITY (904) |
|---|---|---|---|---|
| onDangerAlert() | LAT. 35.621N LOG. 139.167E | 10:32:56 | 20 m | HIGH |
| onDangerCount() | LAT. 35.621N LOG. 139.167E | 10:32:58 | ∞ | LOW |
| onGoal() | LAT. 35.634N LOG. 139.168E | 10:32:58 | 30 m | MIDDLE |
| onCorner() | LAT. 35.785N LOG. 139.133E | 10:33:24 | 5 m | HIGH |
| onSpeedExceeded() | LAT. 35.872N LOG. 139.165E | 10:34:00 | FOR 3 sec | MIDDLE |

310

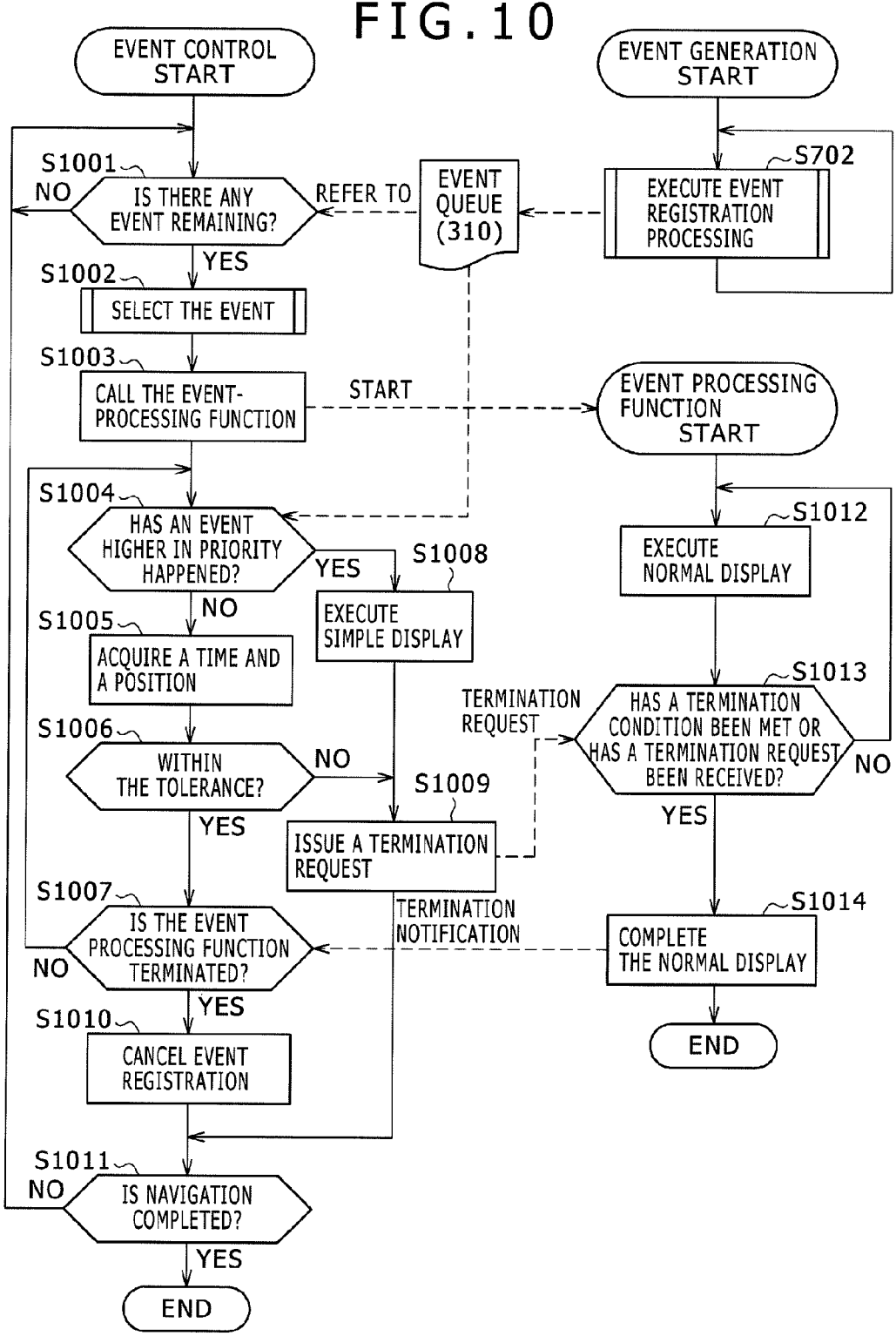

FIG.11

| CONDITION | REMAINING DISTANCE UP TO THE TOLERANCE |
|---|---|
| IF THE TOLERANCE IS DESIGNATED IN TERMS OF A DISTANCE FROM AN EVENT OCCURRENCE POSITION | REMAINING DISTANCE - A DIFFERENCE IN DISTANCE BETWEEN A PRESENT POSITION AND THE EVENT OCCURRENCE POSITION |
| IF THE TOLERANCE IS DESIGNATED IN TERMS OF A TIME LENGTH FROM AN EVENT OCCURRENCE TIME | {REMAINING DISTANCE - (A DIFFERENCE IN TIME BETWEEN A PRESENT TIME AND THE EVENT OCCURRENCE TIME)} × PRESENT SPEED |

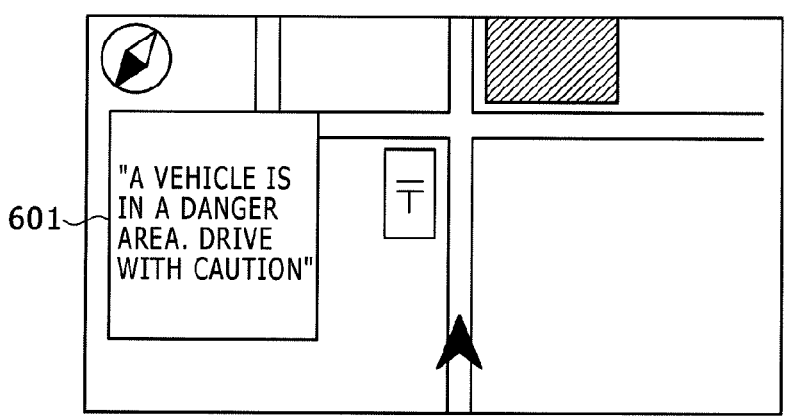

FIG.19
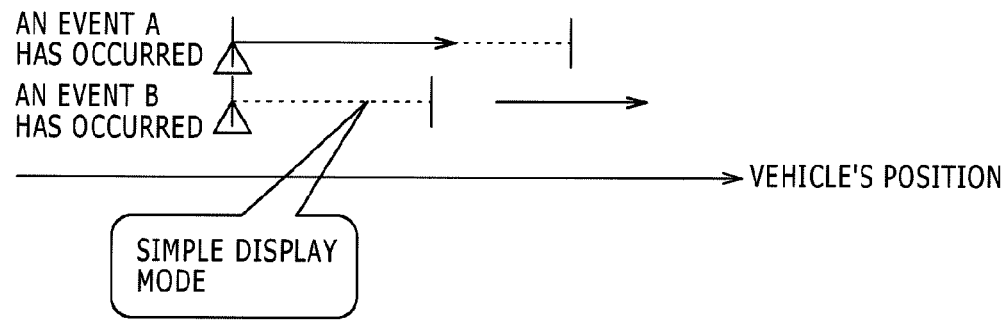
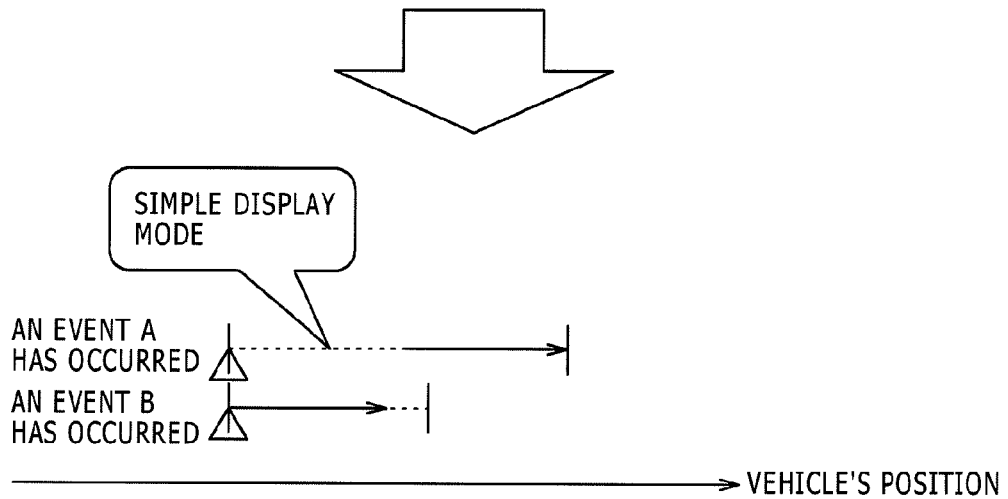

NAVIGATION SYSTEM AND NAVIGATION METHOD

CLAIM OF PRIORITY

The present application claims priority from Japanese patent application serial no. 2012-245156, filed on Nov. 7, 2012, the content of which is hereby incorporated by reference into this application.

BACKGROUND

The present invention relates to a navigation system and a navigation method, for executing a guidance with speech and display and in particular to a navigation system and a navigation method, for outputting plural guidances for guidance events that have happened in an overlapping manner, and inhibiting a guidance that is meaningless to a user.

In a vehicle navigation system for use in executing a path-guidance up to a destination, a guidance to a user, such as an approach to a crossover point, speeding, and receipt of traffic information, is often executed by means of speech and a screen display. A function has been known whereby a direction in which a user makes a turn is shown by means of a screen and speech, for example, immediately before a vehicle comes to a crossover point. Speech-outputting and screen display are executed whenever necessary on a event-by-event basis every time an event happens, the event being the cause thereof. For this reason, if a screen display based on a certain event is in the course of execution, and concurrently, another event on which another display is to be executed happens, this will lead to a situation where plural display requests are accumulated as a list. Accordingly, in the case where displays are sequentially shown in the order in which events have happened, it follows that the next display is shown after completion of an immediately preceding event. In consequence, timing of outputting speech and a screen display is provided after the vehicle has passed a location where the speech and the screen display are to be outputted, and therefore, there is a possibility that a guidance that is meaningless to a user is executed. To take an example, if speeding occurs in the course of the display of a guidance on a crossover point, and attention-attracting speech is outputted after completion of the display of the guidance on the crossover point, it is conceivable that the vehicle has already largely passed a location where the speeding occurred.

Accordingly, a technology for controlling plural guidances for a user has been proposed.

For example, with a navigation system disclosed in Japanese Unexamined Patent Application Publication No. 2002-236029, if the necessity of outputting a speech guidance having higher priority arises in the course of a certain speech guidance being outputted, the guidance being outputted at present is interrupted, and the speech guidance having higher priority is outputted.

Further, with a navigation system disclosed in Japanese Unexamined Patent Application Publication No. 2006-267328, the order of speech-guidance priorities are pre-decided for every speech-guidance types, and in the case where a speech-guidance that is about to be outputted at present is outputted, determination is made on whether or not overlapping by a speech-guidance having higher priority will occur by a completion time of the outputting. If the overlapping by the speech-guidance having higher priority occurs, the speech guidance that is about to be outputted at present is not executed. Thereby, a speech-guidance having lower priority is prevented from being interrupted by the speech-guidance having higher priority.

SUMMARY

In the navigation systems disclosed in Japanese Unexamined Patent Application Publication No. 2002-236029, and Japanese Unexamined Patent Application Publication No. 2006-267328, respectively, a problem exists in that if plural guidance-outputs overlap each other, which of the guidances is to be outputted is determined according to a preset priority, and a guidance lower in priority is interrupted or cancelled, so that the guidance lower in priority is not outputted. Further, if the guidance lower in priority is executed after a guidance higher in priority is outputted, a time when the guidance lower in priority is executed is delayed, thereby creating a problem of outputting information meaningless to a user.

The invention has been developed in view of the problems described as above, and it is therefore an object of the invention to provide a navigation system and a navigation method, for outputting plural guidances for guidance events happened in an overlapping manner, and inhibiting a guidance meaningless to a user.

To that end, according to one aspect of the present invention, there is provided a navigation system for executing a guidance with a screen display or speech, the navigation system comprising has a controller for generating the guidance depending on a state of a movable body with the navigation system mounted thereon, and a user interface for receiving supply of the guidance generated by the controller to thereby output the guidance with a screen display or speech to a user of the navigation system. If the controller has plural the guidances as generated, the controller determines a method whereby the user interface outputs a screen display or speech according to an execution condition set depending on the type of a relevant guidance.

Further, according to another aspect of the present invention, there is provided a navigation method in a navigation system for executing a guidance with a screen display or speech, said navigation method comprising the steps of generating the guidance depending on a state of a movable body with the navigation system mounted thereon and outputting the guidance as generated to a user of the navigation system, by means of a screen display or speech. If the guidances generated exist, a method is determined whereby a screen display or speech is outputted according to an execution condition set depending on the type of the guidance.

The present invention can provide a navigation system and a navigation method, for outputting plural guidances for guidance events that have happened in an overlapping manner, and inhibiting a guidance meaningless to a user, and the present invention has an advantageous effect of contributing to improvement in the operation of the navigation system.

BRIEF DESCRIPTION OF THE DRAWINGS

FIG. 2 is a view showing an example of a danger-area list;

FIG. 4 is a view showing an example of an event-processing function table;

FIG. 5 is a view showing the teaching of processing of the event-processing function by way of example;

FIG. 9 is a view showing one example of the teaching of registration in an event queue;

FIG. 10 is a flow chart showing a procedure for event-control and the event-processing function;

FIG. 11 is view showing one example of a calculation formula of a remaining distance up to tolerance;

FIG. 12 is a view showing an example of a screen display when in the case of the normal-display;

FIG. 19 is a view showing an example of a flow, in which the sequence of the event-processing is controlled.

DETAILED DESCRIPTION

An embodiment of a navigation system according to the invention is described hereinafter with reference to the accompanied drawings.

Figure 1:
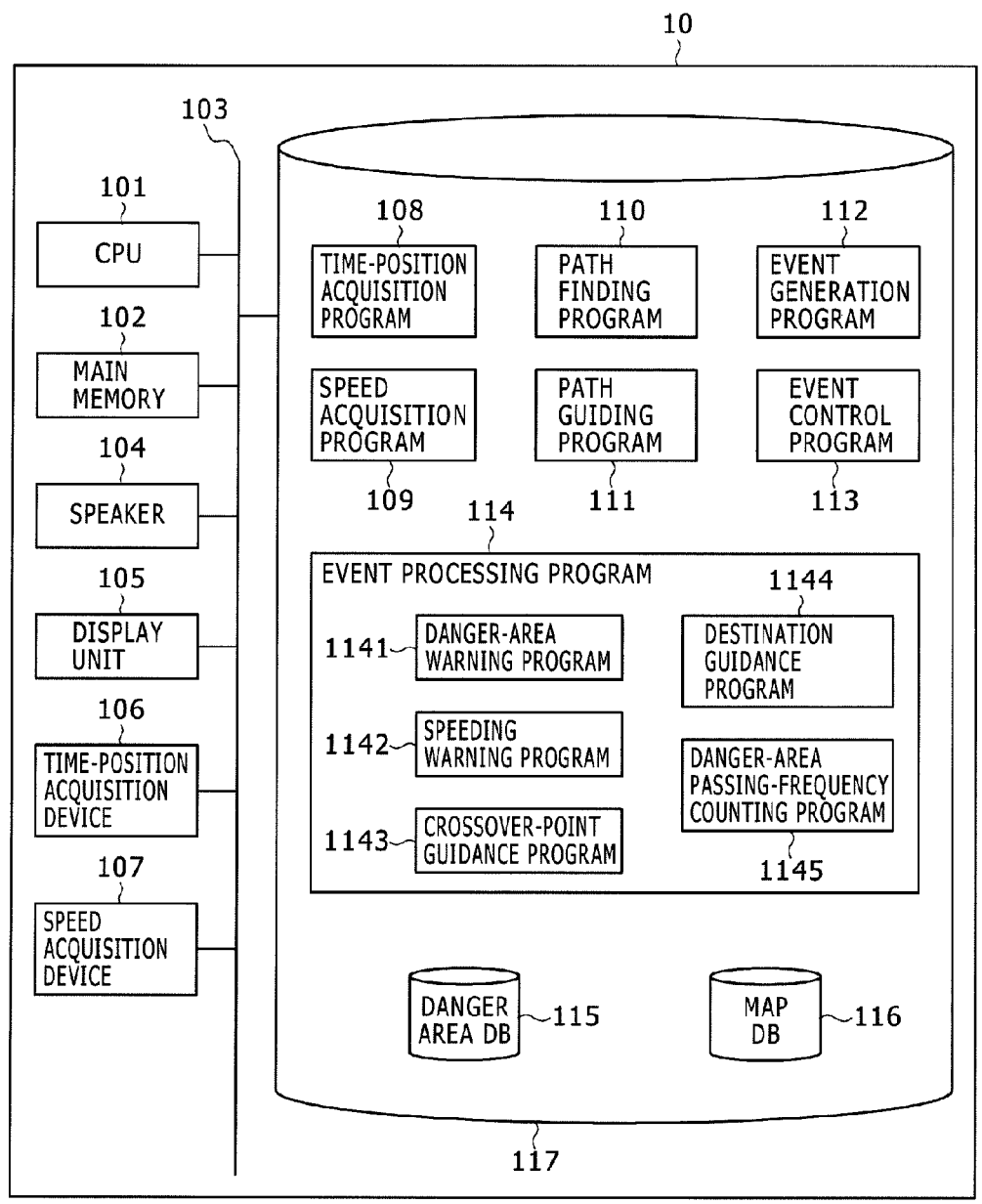
FIG. 1 is a block diagram of a navigation system according to one embodiment of the invention.

FIG. 1 is a block diagram of a navigation system 10 according to one embodiment of the invention.

The navigation system 10, as one embodiment of an event control system according to the invention, has constituent elements including a CPU 101, a main memory 102, a speaker 104, a display unit 105, a time-position acquisition device 106, a speed acquisition device 107, and a secondary memory 117, as shown in FIG. 1. These constituent elements are linked to an inner bus 103.

In the secondary memory 117, there are stored programs including a time-position acquisition program 108, a speed acquisition program 109, a path-browsing program 110, a path-guiding program 111, an event-generation program 112, an event-control program 113, and an event-processing program 114, these programs being loaded into the main memory 102 as necessary, and the CPU 101 is operated according to these programs, thereby executing an event-control processing, as described later on.

Further, the event-processing program 114 incorporates partial programs including a danger-area warning program 1141, a speeding warning program 1142, a crossover-point guiding program 1143, a destination-guiding program 1144, and a danger-area passing-frequency counting program 1145.

Further, in the secondary memory 117, there are stored a danger-area DB (Data Base) 115, and a map DB 116. The danger-area DB 115 holds a table for managing areas, through which a vehicle needs to pass with caution. The map DB 116 holds map data for use in a navigation carried out with the use of the path-browsing program 110, and the path-guiding program 111.

FIG. 2 shows a real-world example of a danger-area list 201 that is stored in the danger-area DB 115. The danger-areas are each designated as a circle, the center poison thereof being given in terms of latitude, and longitude, together with the length of a radius from the center position.

Figure 3:
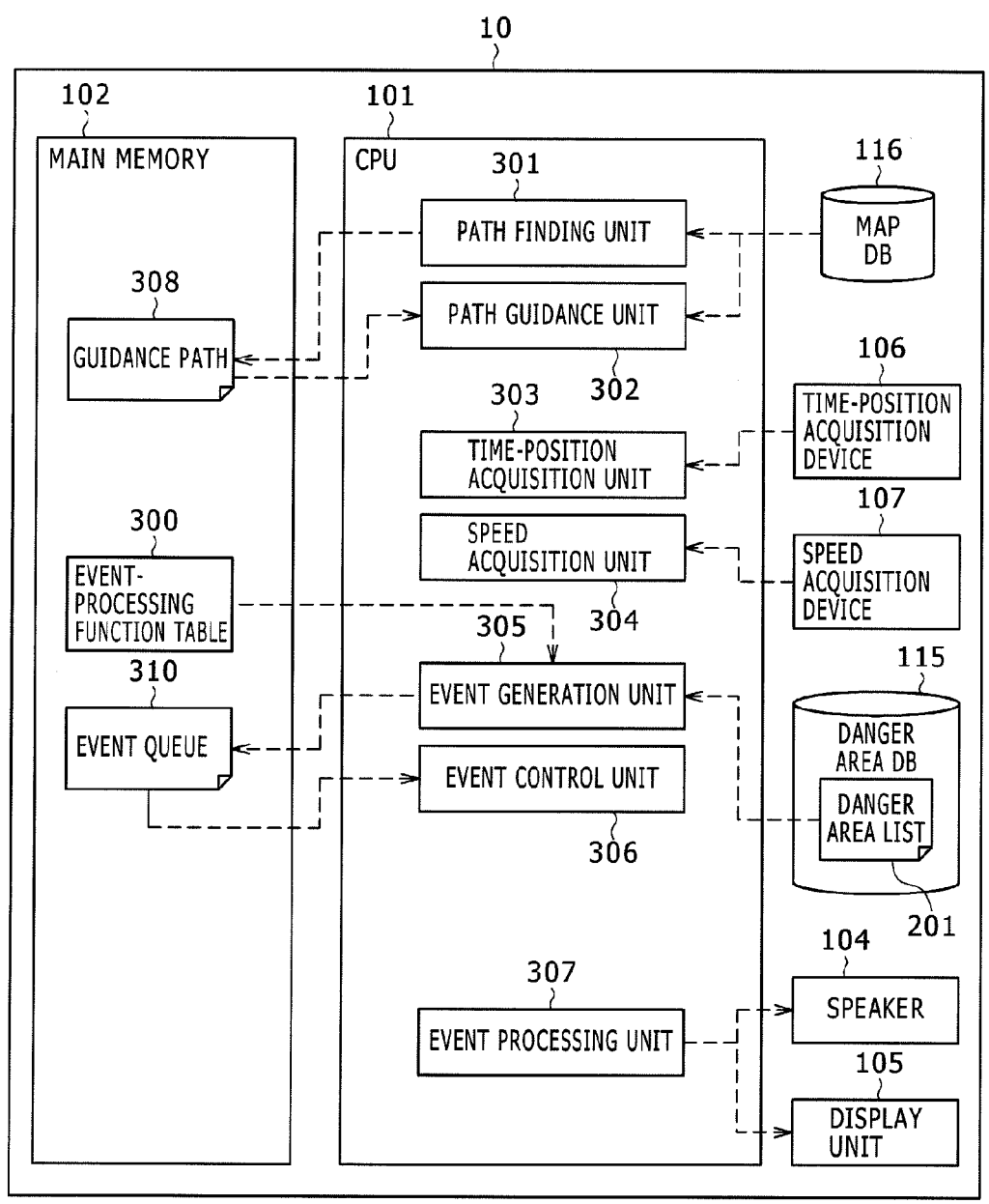
FIG. 3 is a block diagram showing a control operation by the navigation system of FIG. 1.

FIG. 3 is a view conceptually showing an event-control operation by the navigation system 10 according to the present embodiment.

A path-browsing unit 301, a path-guiding unit 302, a time-position acquisition unit 303, a speed acquisition unit 304, an event-generation unit 305, an event-control unit 306, and an event-processing unit 307 each are a functional unit of the CPU 101, executing processing as follows: The path-browsing unit 301 works out a guidance path 308 on the basis of map data read out from the map DB 116. The path-guiding unit 302 executes path-guiding up to a destination on the basis of the map data read out from the map DB 116, and the guidance path 308. The event-generation unit 305 generates an event from each-type event (hereinafter referred to as an event factor) having happened during path-guiding, and event-processing functions registered in an event-processing function table 309, thereby adding the event to an event queue 310. The event-control unit 306 controls the order of executions by the event queue 310 as generated, and the event-processing unit 307 executes actual event-processing, causing the speaker 104 serving as a user-interface to output speech, while causing the display unit 105 to display an image, thereby executing a guidance. The time-position acquisition unit 303 acquires a present time, and a position of a movable body, with the navigation system 10 mounted thereon, from the time-position acquisition device 106. The speed acquisition unit 304 acquires a speed of the movable body, with the navigation system 10 mounted thereon, from the speed acquisition device 107.

FIG. 4 shows an example of the event-processing function table 309 for registering the teaching of processing to be executed for every event factors 401 happening during the path guidance. In the event-processing function table 309, there are registered the event factor 401, an event-processing function 402 to be executed at the time of occurrence of the event factor 401, an allowable condition 403 indicating a condition under which the event-processing function 402 is executed, and priority 404. The allowable condition 403 is designated in terms of a distance, or a time length, from an event-happened position, or an event-happened time, as a starting point. At the time of starting up the navigation system 10 according to the event-processing program 114, the event-processing function table 309 is prepared prior to a path-guidance to a destination.

FIG. 5 shows the teaching of the processing of the event-processing function 402 by way of example. The event-processing function 402 has three teachings of processing, differing from each other, depending on a state in which the processing is executed. A normal-display processing 501 indicates the teaching of display-processing in the case where an event-processing function 402 has precedence over other event-processing functions 402 in execution of the processing. A simple display processing 502 indicates the teaching of processing in the case where the display-processing is executed while the other event-processing functions 402 are executed. A delayed-time processing 503 indicates the teaching of alternative processing to be executed with the other event-processing function 402 in the case where a relevant event-processing function 402 cannot be executed under the allowable condition 403. The present embodiment of the invention has one feature in that the event-processing function 402 is provided with the simple display processing 502, and the delayed-time processing 503, as is evident from description given later on.

Figure 6:
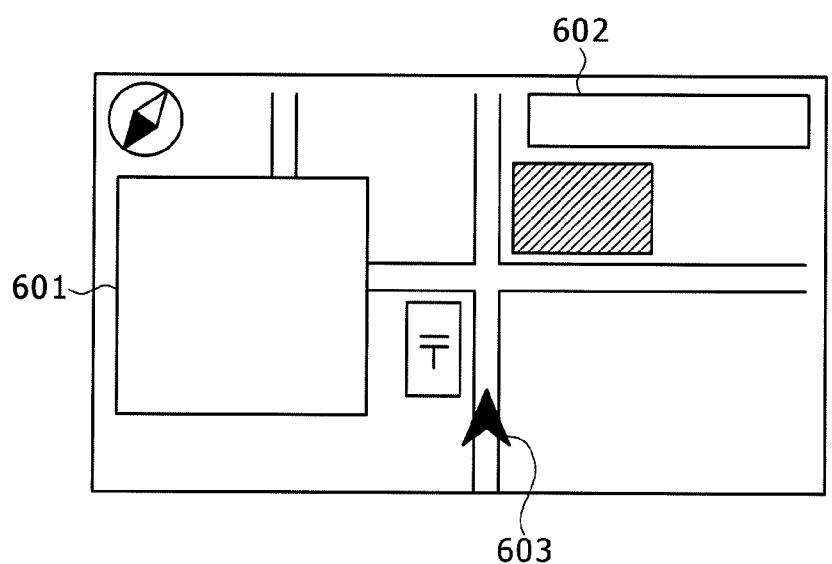
FIG. 6 is a view showing an example of a layout of the screen display of a guidance.

FIG. 6 shows an example of display by the display unit 105 of the navigation system 10, in the course of a path-guidance. A normal-display area 601 is an area for displaying the teaching of the normal-display processing 501 of the event-processing function 402. A simple display area 602 is an area for displaying the teaching of the simple display processing 502 of the event-processing function 402. A vehicle-position display 603 displays a position of a vehicle running at present on the map.

Now, each processing executed by the navigation system 10 is described in detail hereinafter.

Figure 7:
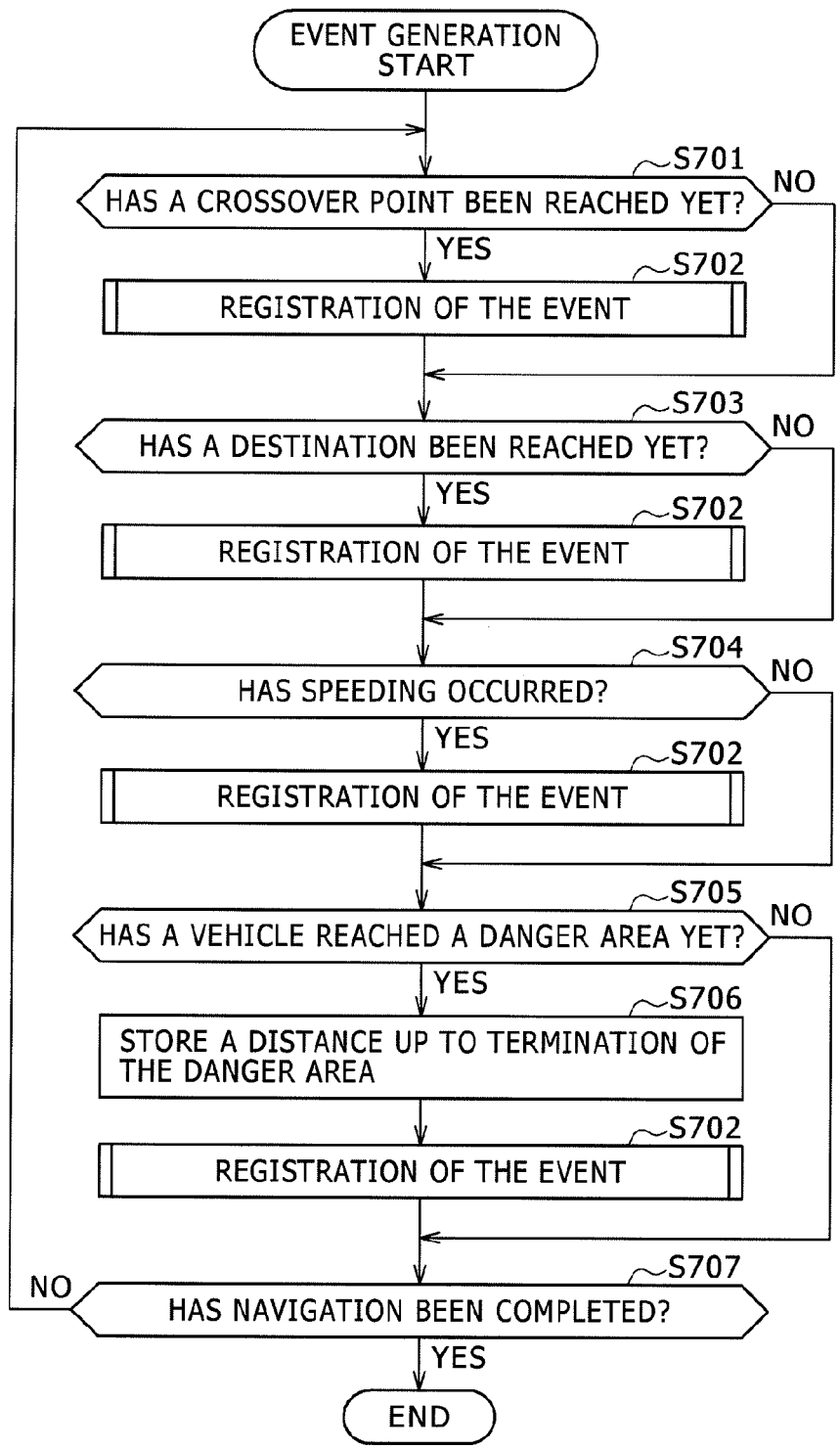
FIG. 7 is a flow chart showing a procedure for event-generation.

FIG. 7 is a flow chart showing a procedure for event-generation. First, the event-generation unit 305 acquires a present position acquired by the time-position acquisition unit 303. The event-generation unit 305 determines whether or not a crossover point on the map data has been reached (step S701), and if the crossover point has been reached, event-registration, as described later on, is executed (step S702). Further, the event-generation unit 305 determines whether or not a destination has been reached (step S703), and if the destination has been reached, the event-registration is executed (the step S702). Next, the event-generation unit 305 determines whether or not a preset speed has been exceeded on the basis of a speed acquired by the speed acquisition unit 304 (step S704), and if the preset sped has been exceeded, the event-registration is executed (the step S702). Next, the event-generation unit 305 compares the present position with the danger-area list 201 to thereby determine whether or not the vehicle has entered a danger area (step S705). If the event-generation unit 305 determines that the vehicle has entered the danger area, the event-generation unit 305 works out a distance required to get out of the danger area, storing the distance (step S706), before executing the event-registration (the step S702). Thus, the event-generation unit 305 repeats processing for the event-registration until a navigation is completed (step S707).

Figure 8:
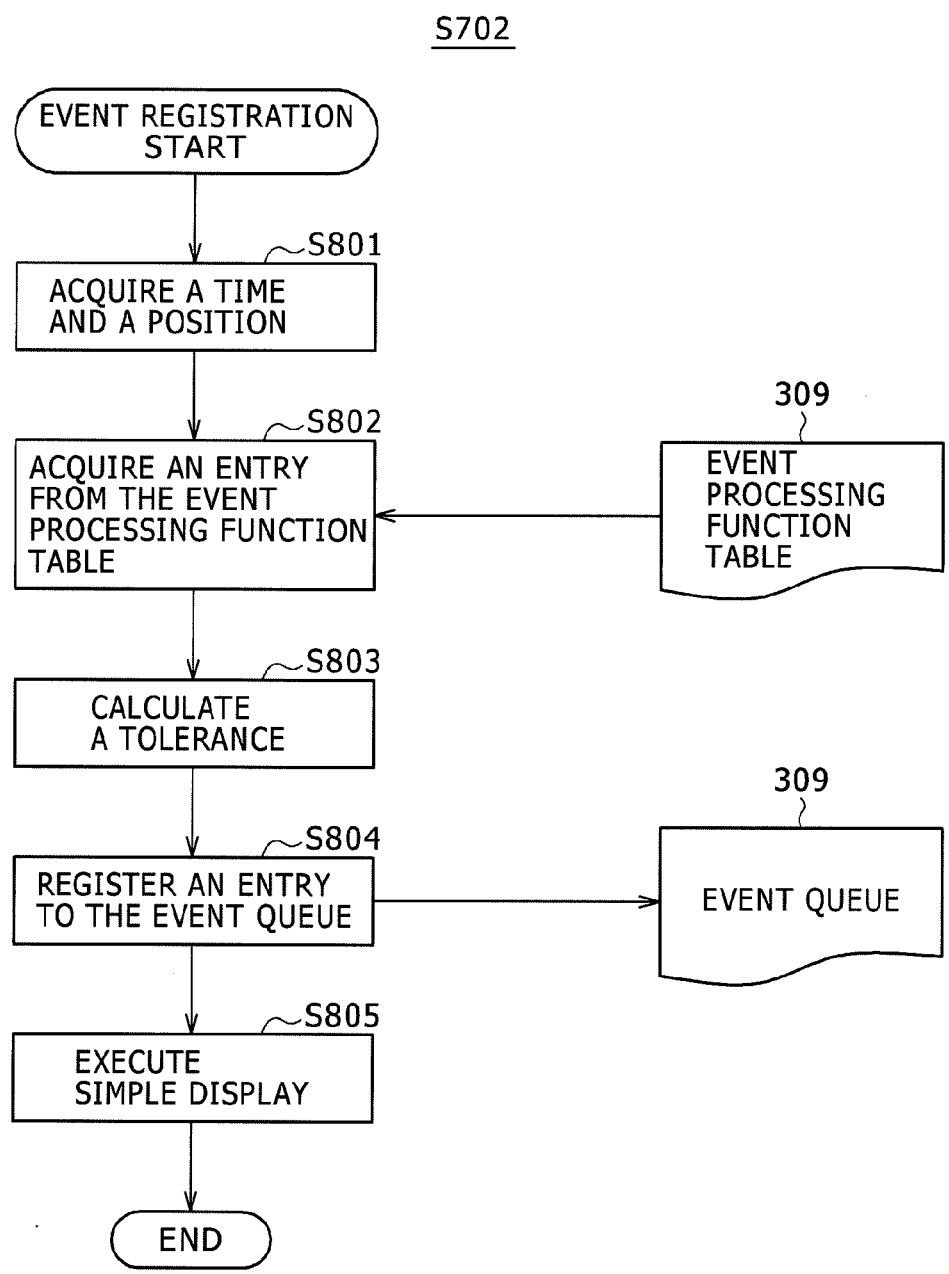
FIG. 8 is a flow chart showing a procedure for event-registration.

FIG. 8 is a flow chart showing a procedure for the event-registration in the step S702.

The time-position acquisition unit 303 acquires a present time and a position (step S801). Next, the event-generation unit 305 acquires entry of the event-processing function 402 for processing an event factor 401 presently under processing from the event-processing function table 309 (step S802). Plural the event-processing functions 402 may correspond to a certain event factor 401. On the basis of the allowable condition 403 of each of the event-processing functions 402 as acquired, and the time as well as the position, acquired in the step S801, the event-generation unit 305 works out a tolerance 903 (described later on, in FIG. 9) corresponding to the event factor 401 having occurred at present (step S803) with reference to the event-processing function 402 acquired in the step S802. The event-generation unit 305 registers the entry for the event queue 310 on the basis of a tolerance 903 as worked out (step S804). Next, a simple display processing 502 corresponding to each of the event-processing functions 402 is displayed in the simple display area 602.

FIG. 9 shows one example of the teaching of a registration in the event queue 310 at a certain point in time. This is an example in which the allowable condition 403 of onDangerAleert( ) as one of the event-processing functions 402 is defined as "from an event-happened point up to an end of a danger area", so that the tolerance 903 with reference to this entry is defined 20 m as a difference in distance between the position acquired in the step S801 and the terminal end of the danger area. Further, onSpeedExeeded ( ) is an example in which time is designated as the tolerance 903.

FIG. 10 is a flow chart showing a procedure for event-control. The event-control is executed by the event-control unit 306. The procedure for the event-control is described hereinafter according to the flow chart shown in FIG. 10. The event-control unit 306 refers to the event queue 310 where the event is registered in an event-registration processing (the step S702) of FIG. 7, determining whether or not an event has happened (step S1001). If the event has happened (Yes, in the step S1001), the event-control unit 306 executes event-selection processing, as described later on (step S1002), thereby invoking an event-processing function as selected (step S1003).

Subsequently, the event-control unit 306 refers to the event queue 310, determining whether or not an event identical in priority to the invoked event-processing function 402 or an event higher in priority than the invoked event-processing function 402 has happened (step S1004). If no event has happened, the event-control unit 306 acquires a time, and a position from the time-position acquisition unit 303 (step S1005), determining whether or not the time and the position have exceeded the tolerance 903 of the event-processing function 402 presently under execution (step S1006).

FIG. 11 is view showing one example of a calculation formula of a remaining distance up to the tolerance. In the step S1006 of FIG. 10, the event-control unit 306 calculates a present position or a present time, and the remaining distance up to the tolerance 903 on the basis of the calculation formula shown in FIG. 11, determining that the tolerance 903 is not exceeded (that is, within the tolerance) if the remaining distance >0. If the event-processing function 402 is not completed, the event-control unit 306 repeatedly executes processing from the step S1004 through the step S1006 (step S1007).

If an event with priority identical to, or higher than the invoked event-processing function 402 has happened in the step S1004 (YES, in the step 1004), the event-control unit 306 executes the simple display processing 502 corresponding to the event-processing function 402 related to an event presently under processing to thereby display the simple display processing 502 in the simple display area 602 (step S1008) before issuing a completion request to the event-processing function 402 (step S1009). If the tolerance 903 is exceeded in the step S1006, the event-control unit 306 issues the completion request (the step S1009). If the event-processing function 402 is completed in the step S1007, the event-control unit 306 frees the registration of a completed event from the event queue 310 (step S1010). The event-control unit 306 repeatedly executes the processing from the step S1001 through the step S1010, described as above, until a navigation is completed (step S1011).

The event-processing function 402 that has been started up in the step S1003 executes a normal display in the normal-display area 601 according to the normal-display processing 501 (step S1012). Thereafter, the normal display is repeatedly executed until a completion condition of the normal-display processing 501 is met or a completion notice from the event-control unit 306 is received (No, in step S1013). In the case of Yes in the step S1013, processing for the normal display is completed (step S1014).

For example, at a time when the event-control unit 306 executes the normal display related to a first event in the normal-display area 601 (the step S1012) according to the flow chart described as above, if the event-control unit 306 determines that a second event higher in priority than the first event has happened (Yes, in the step S1004), the event-control unit 306 controls such that a display related to the first event is executed in the simple display area 602 (the step S1008), and the display related to the first event is completed (the step S1009), and a display related to the second event is executed in the normal-display area 601 (the step S1012). Upon the completion of the normal display related to the second event (the step S1014), the normal display related to the first event can be executed again (the step S1012).

Thereby, the display of information high in priority is executed in the normal-display area 601 of the display unit 105, thereby solving a problem that displaying timing is missed to end up executing a meaningless display. Furthermore, information even though it is low in priority can be displayed in the simple display area 602, thereby solving a problem that a display is not executed at all or displaying timing is missed to thereby execute a meaningless display.

FIG. 12 shows an example of a screen display when the normal-display processing 501 is executed in the step S1012.

Figure 13:
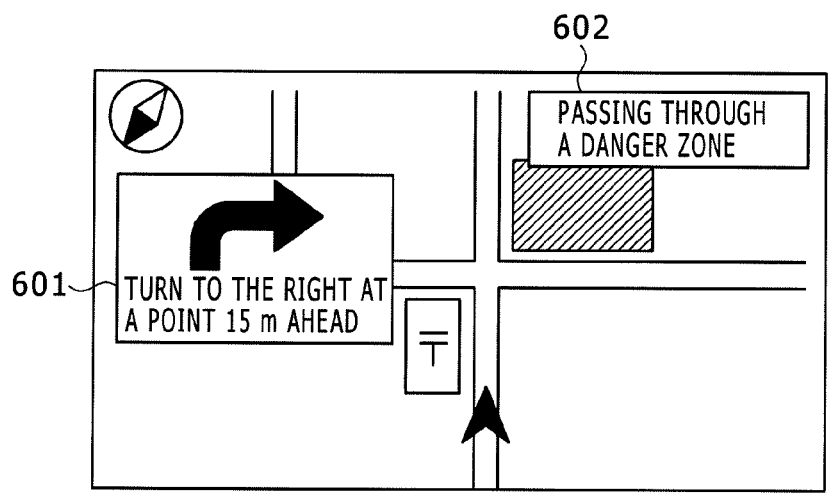
FIG. 13 is a view showing an example of a screen display when the normal display is executed concurrently with the simple display.

FIG. 13 shows an example of a screen display when alteration from the normal display to the simple display is made in the step S1008, and subsequently, the normal display of an event-processing function higher in priority is executed in the step S1012.

Figure 14:
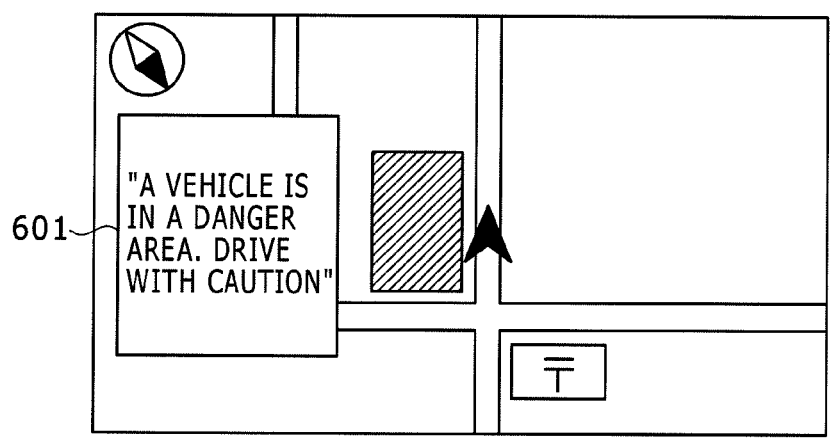
FIG. 14 is a view showing an example of a screen display when the screen display reverts to a single display from the screen display shown in FIG. 13.

FIG. 14 shows an example of a screen display when an event-processing function higher in priority is completed in the step S1014, and subsequently, the event-processing function that was originally executed in the step S1001 is selected, and the normal display is resumed in the step S1012.

Figure 15:
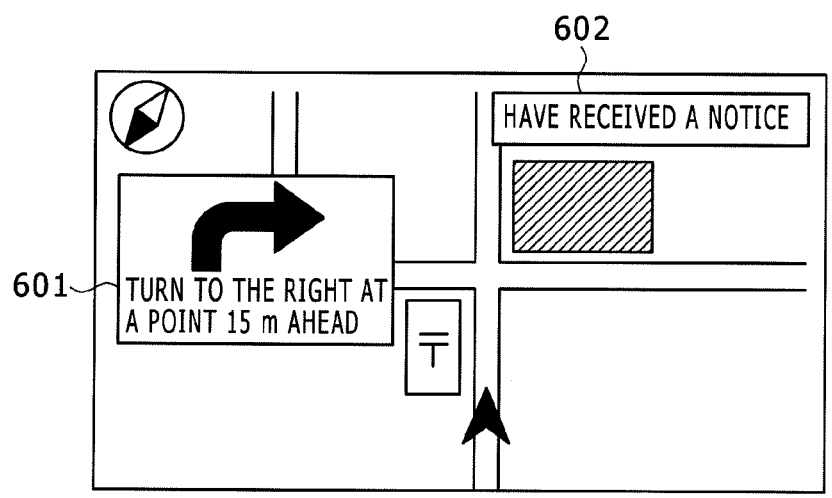
FIG. 15 is a view showing an example of a screen display when plural simple displays are present.

FIG. 15 shows an example of a screen display indicating that plural notices exist if plural events are present in the course of the simple display.

Figure 16:
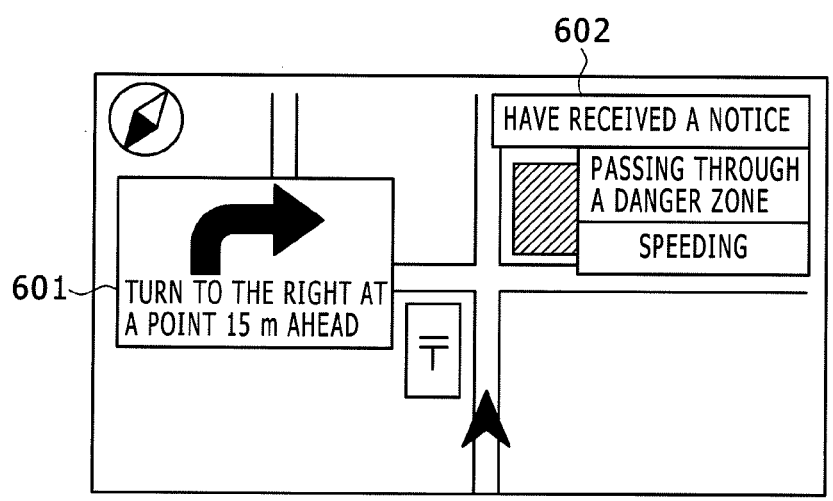
FIG. 16 is a view showing an example of a screen display when the detail of the simple display in FIG. 15 is displayed.

FIG. 16 shows an example of a screen display when respective teachings of plural the simple displays are displayed by touching the simple display area 602 in the screen display shown in FIG. 15.

Figure 17:
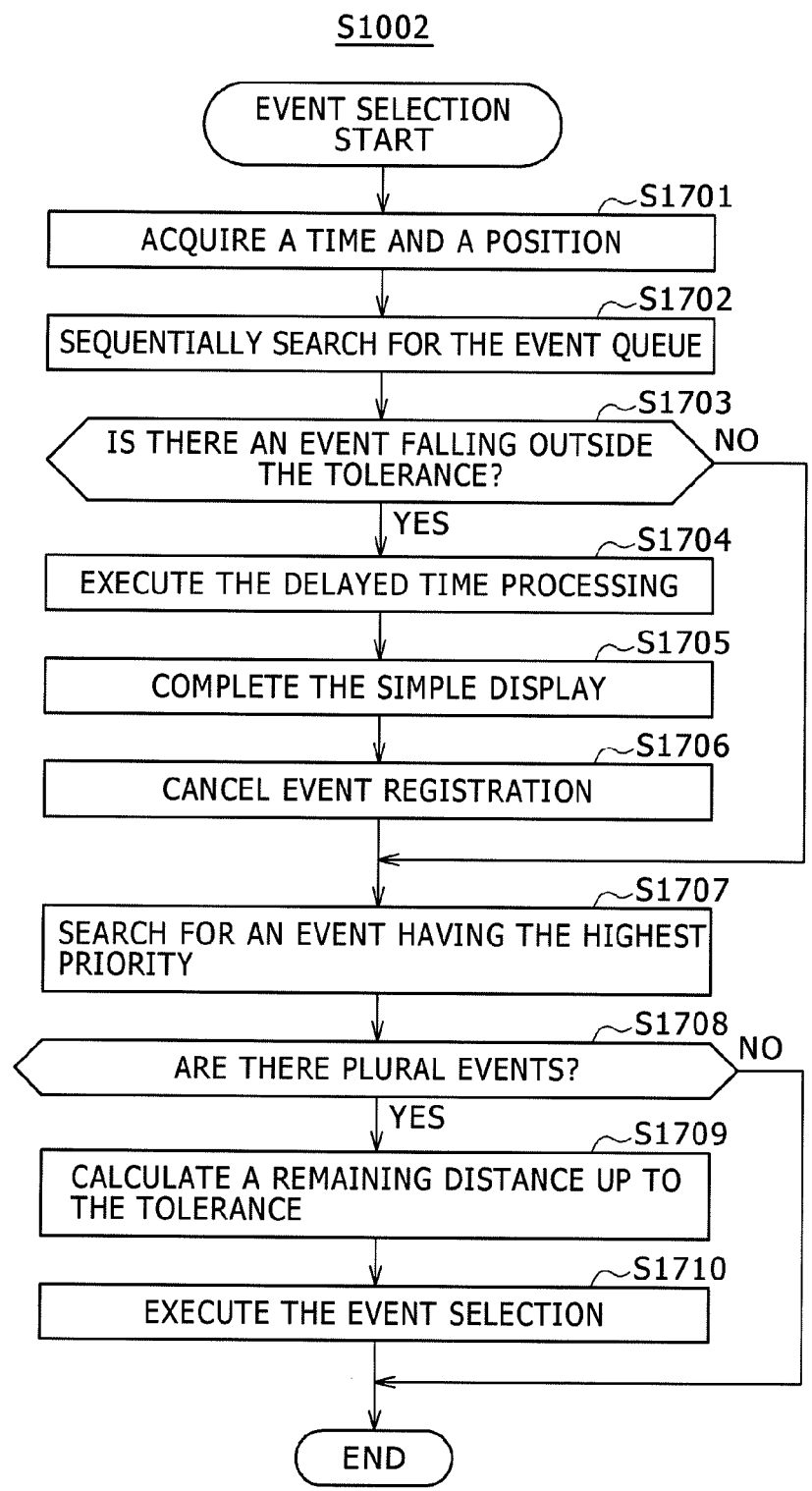
FIG. 17 is a flow chart showing a procedure for the event-selection.

FIG. 17 is a flow chart showing a procedure for the event-selection executed in the step S1002. First, the time-position acquisition unit 303 acquires a time and a position (step S1701). The event-control unit 306 sequentially browses the event queue 310 (step S1702) to thereby discriminate an event falling outside the tolerance 903 on the basis of the time and the position, acquired in the step S1701. Further, the event-control unit 306 executes the delayed-time processing 503 with reference to the event falling outside the tolerance 903 (step S1704), completing the simple display (step S1705) to thereby free the event-registration from the event queue 310 (step S1706). The event-control unit 306 scans the event queue again to discriminate an event having the highest priority (step S1707), and if plural the events exist (Yes, in step S1708), the event-control unit 306 works out a remaining distance up to the tolerance with reference to each of the events with the calculation formula 1101 described previously, (step S1709) to thereby select an event having the shortest distance up to the tolerance (step S1710). If only one event exists in the step S1708 (No, in the step S1708), the event-control unit 306 selects a relevant event.

Figure 18:
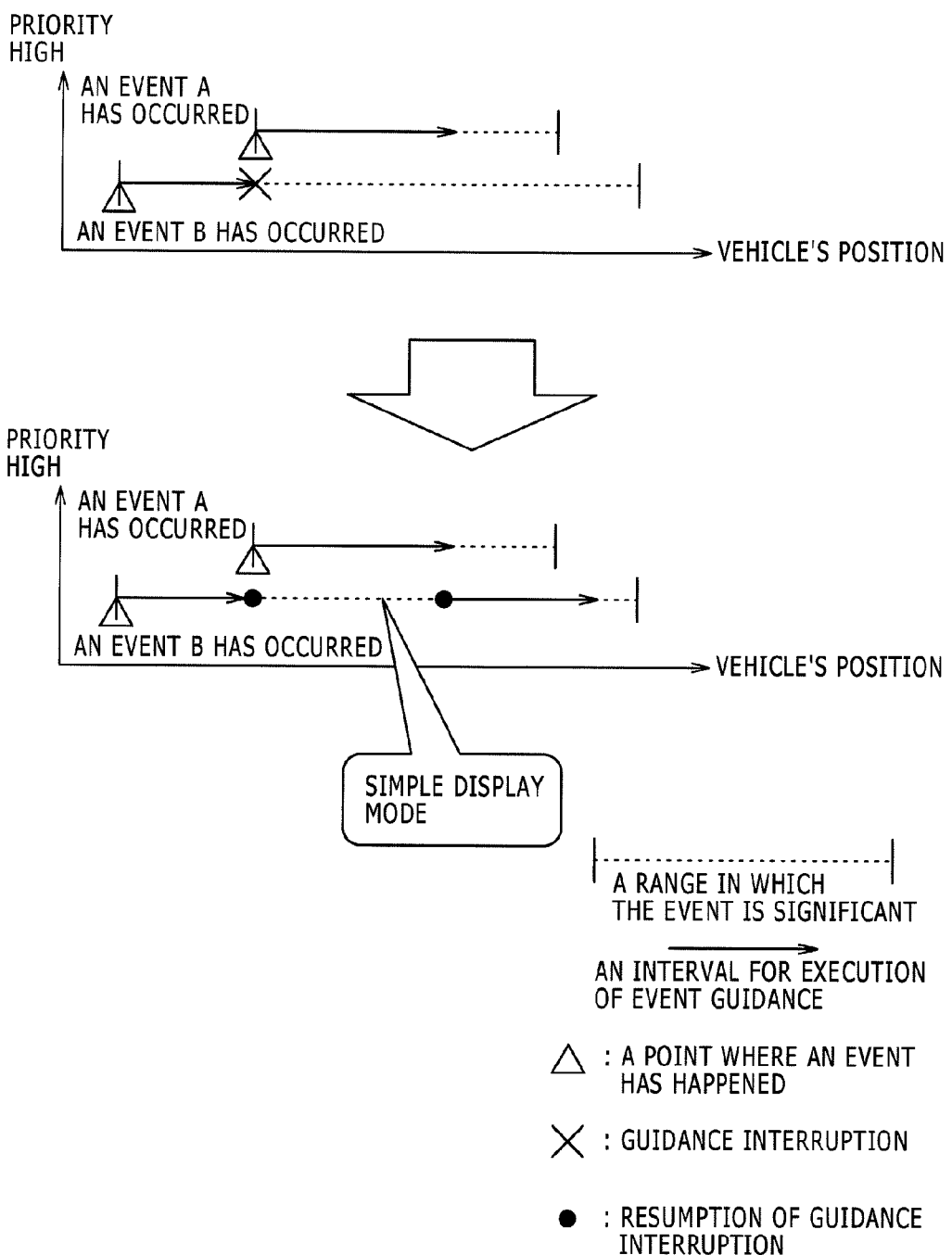
FIG. 18 is a view showing an example of a flow, in which event-processing of an event lower in priority is resumed.

According to the flow chart described as above, the event-control unit 306 can free the registration of an event that have lost the significance of displaying any longer from the event queue 310 (the step S1706), and even if the plural events high in priority exist, the event-control unit 306 can select one event on the basis of the remaining distance (the step S1706). Thereby, a problem of displaying the event having already lost the significance of displaying, or executing a meaningless display by missing displaying timing can be solved FIG. 18 shows an example in which the display of an event B lower in priority is resumed by the control unit according to the present embodiment, following the completion of the display of an event A higher in priority. As shown in this example, if the event B is in a significant range, it is possible to determine on the execution of the event B lower in priority in the normal-display area 601 even after the display of the event A higher in priority was once executed.

FIG. 19 shows an example in which if two events A, B have the same priority, the display of the event B smaller in tolerance is preferentially executed by the control unit according to the present embodiment. In this example, there is shown the case where if display is executed by starting from the event smaller in tolerance with the normal-display area 601, this will enable the event-processing of both the events A, B to be executed in respective significant ranges.

Figure 20:
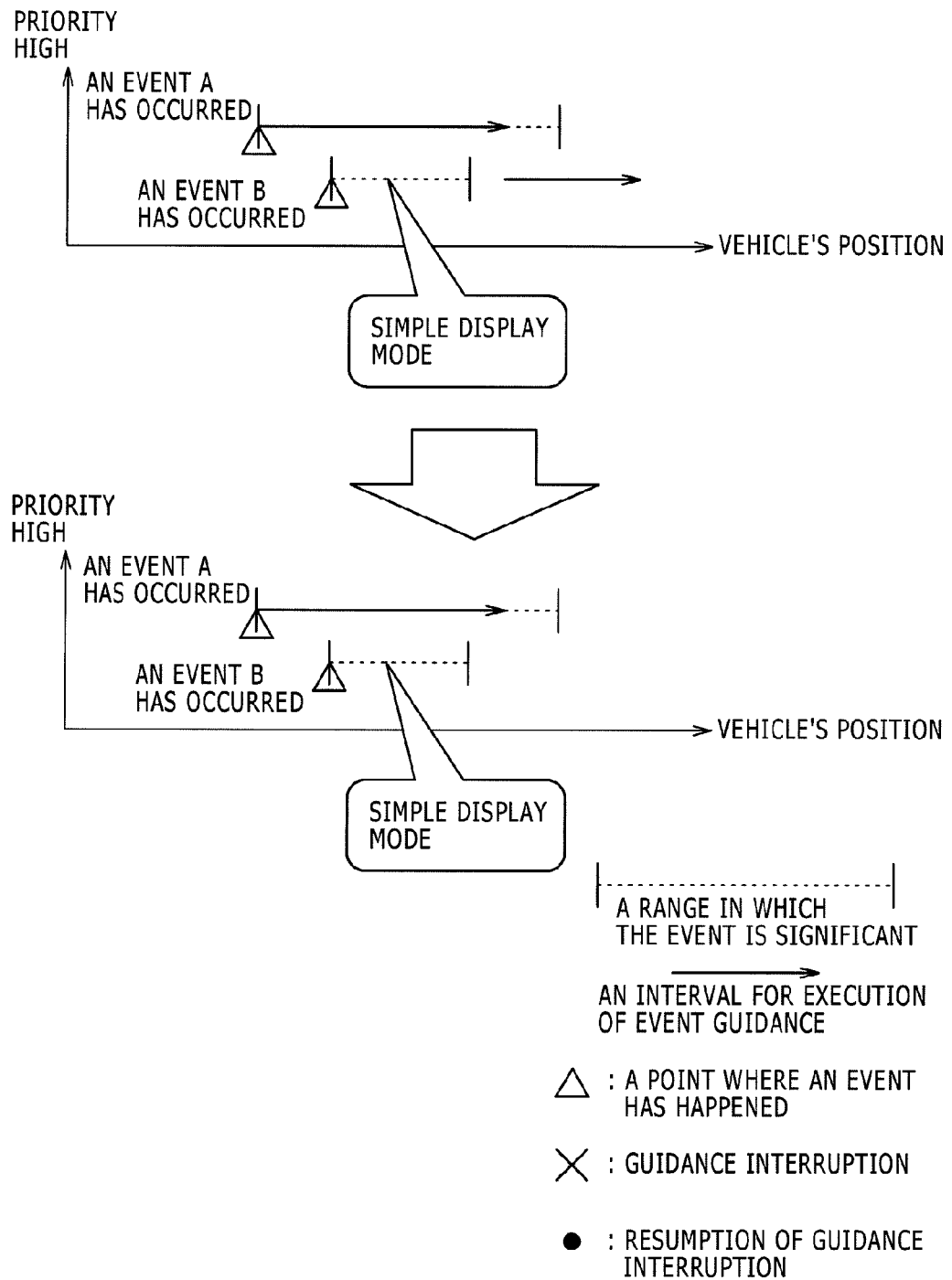
FIG. 20 is a view showing an example of a flow, in which the event-processing of an event lower in priority is not executed.

FIG. 20 shows an example in which at timing for executing the display of an event B lower in priority with the control unit according to the present embodiment, the event B has exceeded a significant range, so that event-processing is not executed. As shown in this example, it is possible to inhibit the event-processing at a position that is meaningless to a user.

Further, in any of the examples shown in FIGS. 18 through 20, respectively, the display of an event to be deferred in processing is executed in the simple display area 602, so that it is possible to solve the problem that the relevant event is not displayed at all.

As described in the foregoing, according to the present invention, the respective displays of the plural events to be guided are executed in the order in which the event higher in priority is first outputted, and the simple display of a guidance with respect to an event lower in priority as well can be executed. Furthermore, if a guidance on a certain event is completed, an event falling outside the tolerable position of a guidance is not selected as the next selected event, so that a meaningless output to a user can be inhibited.

What is claimed is:

1. A navigation guidance control system, comprising:
a movable body configured to transition between a plurality of states;
a navigation system disposed on the movable body;
a controller configured to determine each of the plurality of states of the movable body and generate a plurality of guidances to be provided to a user, each of the plurality of guidances generated based on a determined state of the movable body; and
a user interface configured to receive the plurality of guidances generated by the controller and provide the plurality of guidances visually or aurally to a user of the navigation system,
wherein the plurality of guidances are provided responsive to events, each event corresponding to: (i) an event processing function; (ii) an allowable condition indicating a condition under which the event-processing function is executed based on a distance from a position an event occurs or a time length from a time the event occurs; and (iii) a priority,
when the controller generates a first guidance of the plurality of the guidances corresponding to a first event and a second guidance of the plurality of the guidances corresponding to a second event and the allowable conditions overlap with each other, the controller is configured to control the providing of the plurality of the guidances to the user by determining a method of causing the user interface to provide the plurality of guidances according to a plurality of teachings of the event processing functions for the first event and the second event, the plurality of teachings for each of the first event and the second event comprising: (i) normal processing indicating a corresponding teaching of processing in a case of one event processing function determined to have a higher priority than the other event processing function; simple processing indicating a corresponding teaching of processing in a case when the one event processing function is executed while the other event processing function is being executed; and a delayed-time processing indicating the teaching of processing to be executed with the one event processing function in the case of the other event processing function cannot be executed under the corresponding allowable condition of the other event processing function.

2. The navigation system according to claim 1, wherein the method determines an order in which the user interface visually or aurally provides the guidance.

3. The navigation system according to claim 1, wherein, when the distance from the position the event occurs or the time length from the time the event occurs, determined according to the allowable condition is exceeded, the providing of the plurality of guidances is stopped.

4. The navigation system according to claim 1, wherein, when the controller generates the plurality of guidances, the controller generates a plurality of display areas differing in magnitude from each other, in the user interface, thereby executing the display of the guidance high in priority in a large display area while executing the simple display of the guidance low in priority in a small display area.

5. The navigation system according to claim 4, wherein when the controller has the plural guidances low in priority, the controller displays the plural guidances in the display area for the simple display.

6. The navigation system according to claim 4, wherein when the guidance high in priority is completed, the controller displays the guidance low in priority in the large display area.

7. A navigation guidance control method in a navigation system the method comprising:

determining, by a control processor, each of a plurality of states of a movable body and generate a plurality of guidances of a navigation system disposed on the moveable body to be provided to a user;

generating each of the plurality of guidances based on a determined state of the movable body;

providing, by the control processor, the plurality of guidances responsive to events, each event corresponding to: (i) an event processing function; (ii) an allowable condition indicating a condition under which the event processing function is executed based on a distance from a position an event occurs or a time length from a time the event occurs; and (iii) a priority;

when the controller processor generates a first guidance of the plurality of the guidances corresponding to a first event and a second guidance of the plurality of the guidances corresponding to a second event and the allowable conditions overlap with each other, providing, by the control processor, the plurality of the guidances to the user by determining a method of providing the plurality of guidances according to a plurality of teachings of the event processing functions for the first event and the second event; and the plurality of teachings for each of the first event and the second event comprising: (i) normal processing indicating a corresponding teaching of processing in a case of one event processing function determined to have a higher priority than the other event processing function; simple processing indicating a corresponding teaching of processing in a case when the one event processing function is executed while the other event processing function is being executed; and a delayed-time processing indicating the teaching of processing to be executed with the one event processing function in the case of the other event processing function cannot be executed under the corresponding allowable condition of the other event processing function.

8. The navigation method according to claim 7, wherein the method of providing the plurality of guidances determines an order in which the plurality of guidances are provided is outputted.

9. The navigation method according to claim 7, wherein when the distance from the position the event occurs or the time length from the time the event occurs, determined according to the allowable condition, is exceeded, the providing of the plurality of guidances is stopped.

10. The navigation method according to claim 7, wherein the corresponding teaching is related to a screen to be displayed, the allowable condition is determined on the basis of the priority of the guidance, and when the plural guidances generated are present, a plurality of display areas differing in magnitude from each other are generated in the user interface, thereby displaying the guidance high in priority in a large display area while executing the simple display of the guidance low in priority in a small display area.

11. The navigation method according to claim 10, wherein, when the plural guidances low in priority are present, the plural guidances are displayed in the display area for the simple display.

12. The navigation method according to claim 10, wherein when the guidance high in priority is completed, the guidance low in priority is displayed in the large display area.

* * * * *